United States Patent
Adams et al.

(10) Patent No.: US 8,023,656 B2
(45) Date of Patent: *Sep. 20, 2011

(54) AUTOMATED KEY MANAGEMENT SYSTEM AND METHOD

(75) Inventors: Neil P. Adams, Waterloo (CA); Michael S. Brown, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 215 days.

This patent is subject to a terminal disclaimer.

(21) Appl. No.: 12/404,749

(22) Filed: Mar. 16, 2009

(65) Prior Publication Data

US 2009/0217044 A1   Aug. 27, 2009

Related U.S. Application Data (63) Continuation of application No. 10/913,499, filed on Aug. 9, 2004, now Pat. No. 7,506,164.

(51) Int. Cl.
*H04L 9/00* (2006.01)
*G06F 7/04* (2006.01)

(52) U.S. Cl. ......... 380/277; 713/156; 713/157; 713/175

(58) Field of Classification Search .................. 380/286, 380/277; 713/156
See application file for complete search history.

(56) References Cited

U.S. PATENT DOCUMENTS

| | | | |
|---|---|---|---|
| 5,515,439 A | 5/1996 | Bantz et al. | |
| 6,496,932 B1 * | 12/2002 | Trieger | 713/168 |
| 6,738,907 B1 | 5/2004 | Carter | |
| 6,813,356 B2 | 11/2004 | Kuvaja et al. | |
| 6,853,729 B1 | 2/2005 | Mizikovsky | |
| 7,506,164 B2 * | 3/2009 | Adams et al. | 713/171 |
| 7,787,626 B2 | 8/2010 | Brown et al. | |
| 2003/0021418 A1 | 1/2003 | Arakawa et al. | |
| 2003/0035545 A1 | 2/2003 | Jiang | |
| 2003/0196080 A1 | 10/2003 | Karman | |
| 2004/0236632 A1 * | 11/2004 | Maritzen et al. | 705/26 |
| 2005/0050004 A1 | 3/2005 | Sheu et al. | |
| 2005/0244009 A1 | 11/2005 | Brown et al. | |
| 2005/0257072 A1 * | 11/2005 | Cross et al. | 713/193 |
| 2006/0036859 A1 | 2/2006 | Adams et al. | |
| 2009/0217044 A1 | 8/2009 | Adams et al. | |

(Continued)

FOREIGN PATENT DOCUMENTS

WO WO 03/007570 1/2003

OTHER PUBLICATIONS

Co-pending U.S. Appl. No. 10/992,686, "System and Method for Obtaining Certificate Status of Subkeys", filed Nov. 19, 2004. (Retreivable from PAIR).

(Continued)

*Primary Examiner* — Taghi Arani
*Assistant Examiner* — Thaddeus Plecha
(74) *Attorney, Agent, or Firm* — Bereskin & Parr LLP/S.E.N.C.R.L.,s.r.l.

(57) ABSTRACT

A system and method for automatic key and certificate management is disclosed. In particular, a key store in a base computer contains both new and previously viewed cryptographic keys. In one embodiment, for each new key, if a corresponding certificate matches an existing certificate, the new certificate may be automatically downloaded to a mobile communications device without prompting a user.

19 Claims, 7 Drawing Sheets

U.S. PATENT DOCUMENTS

2010/0284536 A1    11/2010    Brown et al.

OTHER PUBLICATIONS

U.S. Office Action dated Jun. 30, 2008, U.S. Appl. No. 10/992,686.
U.S. Office Action Response dated Dec. 24, 2008, U.S. Appl. No. 10/992,686.
Co-pending U.S. Appl. No. 10/913,499, "Automated Key Management System and Method", filed Aug. 9, 2004. (Retreivable from PAIR).
Canadian Office Action dated Mar. 1, 2006, Canadian Patent Application No. 2,476,919.
International Search Report of Application No. PCT/CA2004/001998, date of mailing Mar. 15, 2005, 13 pages.
Coperland et al., "The GNU Privacy Handbook", published in 1999, pp. 1-39.
United States Office Action dated Sep. 21, 2007, U.S. Appl. No. 10/913,499.
United States Office Action Response dated Feb. 21, 2008, U.S. Appl. No. 10/913,499.
United States Final Office Action dated May 28, 2008, U.S. Appl. No. 10/913,499.
United States Office Action Response dated Jul. 24, 2008, U.S. Appl. No. 10/913,499.
United States Advisory Action dated Jul. 29, 2008, U.S. Appl. No. 10/913,499.
United States Notice of Allowance dated Sep. 29, 2008, U.S. Appl. No. 10/913,499.
Co-pending U.S. Appl. No. 10/992,868, "System and Method for Obtaining Certificate Status of Subkeys", filed Nov. 19, 2004.
Birgit Borcherding et al, "Efficient and Trustworthy Key Distribution in Webs of Trust", Computers & Security, Elsevier Science Publishers, Amsterdam, NL, vol. 17, No. 5, 1998, p. 447-454, XP004132883, ISSN: 0167-4048.
Rolf Haenni, "Web of Trust: Applying Probabilistic Argumentation to Public-Key Cryptography", ECSQARU 2003, 2003, p. 243-254, XP019001386.
William Stallings, "The PGP Web of Trust; How to Certify Public Keys Without a Central Authority", Byte, McGraw-Hill Inc., Peterborough, NH, US, vol. 20, No. 2, Feb. 1, 1995, p. 161-162.
United States Office Action dated Jun. 30, 2008, U.S. Appl. No. 10/992,868.
United States Office Action Response dated Dec. 24, 2008, U.S. Appl. No. 10/992,868.
United States Restriction Requirement dated Apr. 1, 2009, U.S. Appl. No. 10/992,868.
United States Restriction Requirement Response dated May 1, 2009, U.S. Appl. No. 10/992,868.
United States Final Office Action dated Jul. 23, 2009, U.S. Appl. No. 10/992,868.
United States Office Action Response dated Sep. 23, 2009, U.S. Appl. No. 10/992,868.
United States Advisory Action dated Oct. 5, 2009, U.S. Appl. No. 10/992,868.
United States Request for Pre-Appeal Brief Panel Review dated Jan. 25, 2010, U.S. Appl. No. 10/992,868.
United States Pre-Appeal Brief Conference Decision dated Feb. 25, 2010, United States Patent Application No. 10/992,868.
United States Notice of Allowance dated Apr. 28, 2010, U.S. Appl. No. 10/992,868.
Co-pending U.S. Appl. No. 12/842,133, "System and Method for Obtaining Certificate Status of Subkeys", filed Jul. 23, 2010.
Co-pending U.S. Appl. No. 12/350,452, "Automated Key Management System and Method", filed Jan. 8, 2009.
United States Office Action dated Dec. 8, 2010, U.S. Appl. No. 12/350,452.
United States Office Action Response dated Mar. 8, 2011, U.S. Appl. No. 12/350,452.

* cited by examiner

AUTOMATED KEY MANAGEMENT SYSTEM AND METHOD

CROSS-REFERENCE TO RELATED APPLICATIONS

This application is a continuation of, and claims priority to, prior U.S. patent application Ser. No. 10/913,499, filed on Aug. 9, 2004, the entirety of which is hereby incorporated by reference.

BACKGROUND OF THE INVENTION

1. Field of the Invention

The present invention relates generally to mobile wireless communications devices capable of processing cryptographically secure messages and information. In particular, the disclosure is directed to a mobile wireless communications device having cryptographic messaging capability in which automatic key detection and synchronization are provided.

2. Related Art

Exchanging cryptographically secured electronic messages and data, such as, for example, e-mail messages, is well known. Cryptographically secured electronic messaging typically requires the use of cryptographic keys to perform various cryptographic functions relating to secured electronic messages. In order to ensure that a user is able to perform cryptographic functions, such as, for example, signing, verifying, encrypting, decrypting, etc., secure e-mail messages, users are typically required to transfer their cryptographic keys from, for example, a desktop PC or the like, to the mobile wireless communications device. This transfer is typically accomplished via a hard-wired serial connection that accommodates a mobile wireless communications device and provides an interface to the user's desktop PC. When the mobile device is in communication with the user's desktop, a utility, such as, for example, the Certificate Synchronization (sometimes referred to as "Cert Sync") running on the user's desktop is used to allow the user to choose which keys to synchronize to the mobile wireless communications device.

Periodically, users get issued new signing/decryption keys, for example, for use in secure e-mail messaging. This may be done fairly frequently in some systems, for example automatic key rollover systems such as that employed by Entrust™, or less frequently if the users keys only expire every couple of years or so.

When a new key or keys are issued, the user must load these new keys onto the user's mobile wireless communications devices in order to be able to sign and decrypt secured messages with the new keys. Typically, the process of updating the keys for the mobile wireless communications device involves running Cert Sync on the user's desktop; manually identifying which keys are new; manually selecting keys to download; and synchronizing with the mobile wireless communications device. Users may not realize that new keys have been issued in which case they will not be able to read encrypted e-mail until they synchronize with their desktop and update the device key store.

This method of key management for mobile wireless communications devices is cumbersome, inefficient, subject to widespread inaccuracies and is difficult to implement. As discussed above, it is difficult to identify which keys are new keys even when the user is aware of the issuance of new keys.

BRIEF SUMMARY OF THE INVENTION

In view of the foregoing, we have now identified an efficient, accurate and easy to implement method for key management in devices that are capable of processing cryptographically secured electronic messages, such as, for example, mobile wireless communications devices.

According to a preferred embodiment of the present disclosure, a list of keys that have been used or seen in the past is generated. This list is referred to herein as the history list. Every time Cert Sync is started, the list of keys on the user's desktop is compared with the history list. If new keys have been added to the system since the last update (or last cradling of the mobile wireless communications device), they will not appear on the history list. At this point, the user is informed of the detection of newly issued keys, and prompted to download the new keys, if desired.

If the user elects to download the new keys, the new keys are automatically marked for download. The new keys are then added to the history list so that the user is not prompted with respect to these keys in the future.

Of course, the first time a user starts Cert Sync with this automated key management feature, the history list is empty. Thus, the user will initially be prompted to mark all of the keys for download.

In an alternative embodiment, certificates may be synchronized automatically when the user puts his or her mobile wireless communications device in communication with a desktop without having the user start the Cert Sync utility. In this exemplary embodiment, when the device is put in communication with a desktop, new certificates are checked for by comparing the desktop keys to the history list. If new keys are present, the user is prompted to download keys, and if the user accepts, the new keys are downloaded automatically.

In a further alternative embodiment, automatic downloading of new keys that replace expired keys on the device is contemplated. In this embodiment, when the user puts his or her mobile wireless communications device in communication with a desktop, a check is automatically made for new keys. For each new key, if the corresponding certificate matches a certificate on the device, the new certificate is automatically downloaded without prompting the user. A matching certificate is one that appears to replace an existing certificate, as the old expired certificate has the same common name and issuer name as the new certificate.

The advantages attendant with the various embodiments of the invention described above are provided by the method and system of automated key management disclosed and described herein with reference to the drawings.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which.

DETAILED DESCRIPTION OF EXEMPLARY EMBODIMENTS

Figure 1:
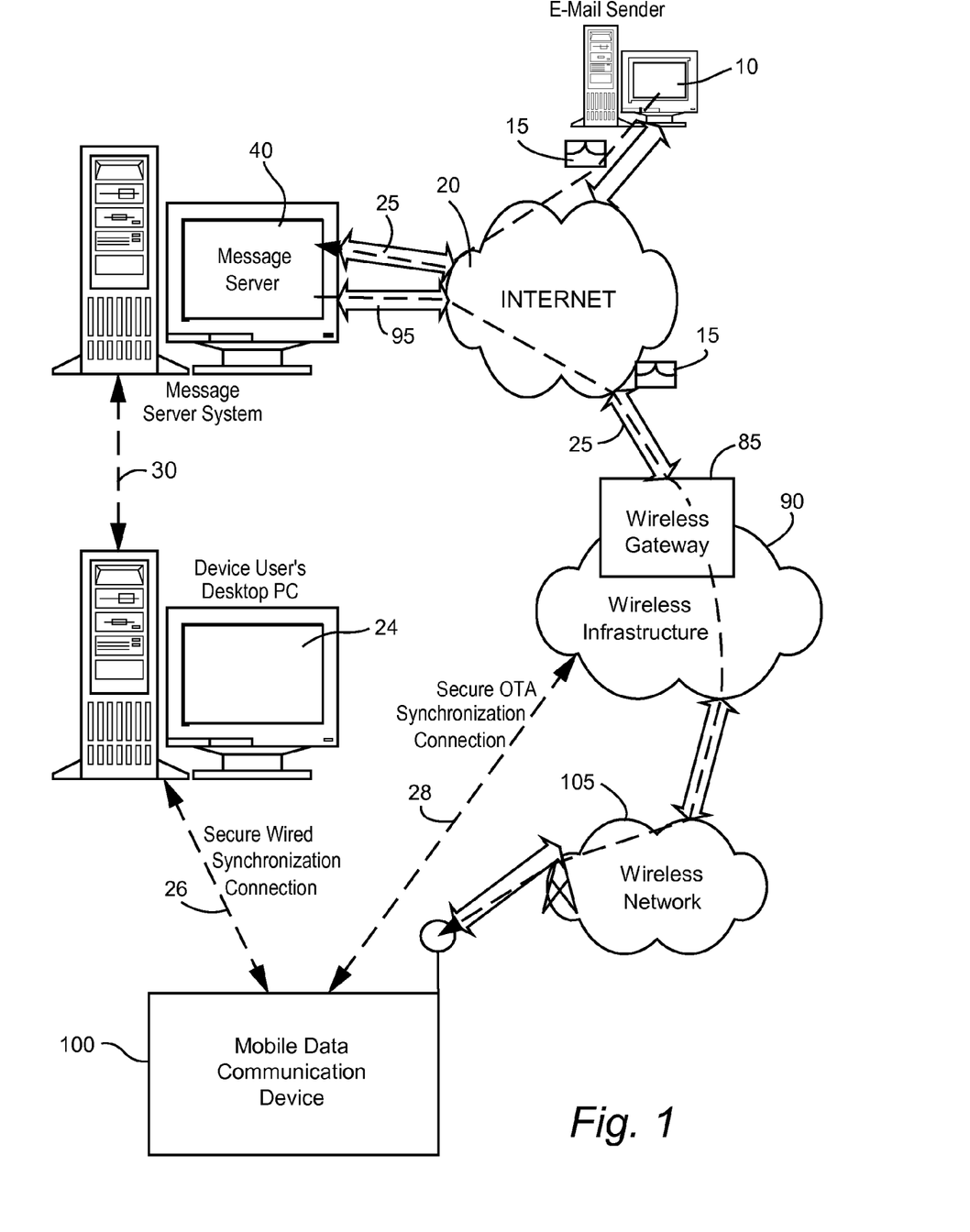
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
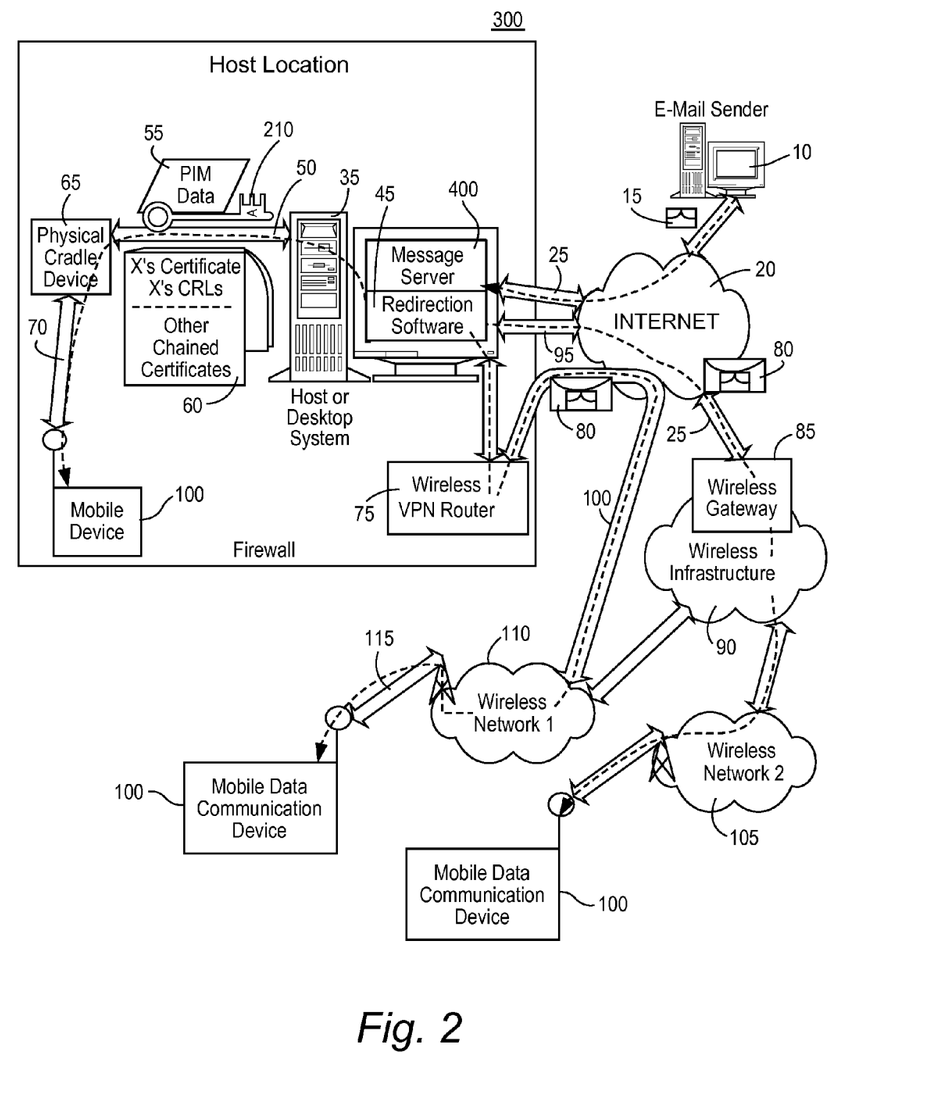
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
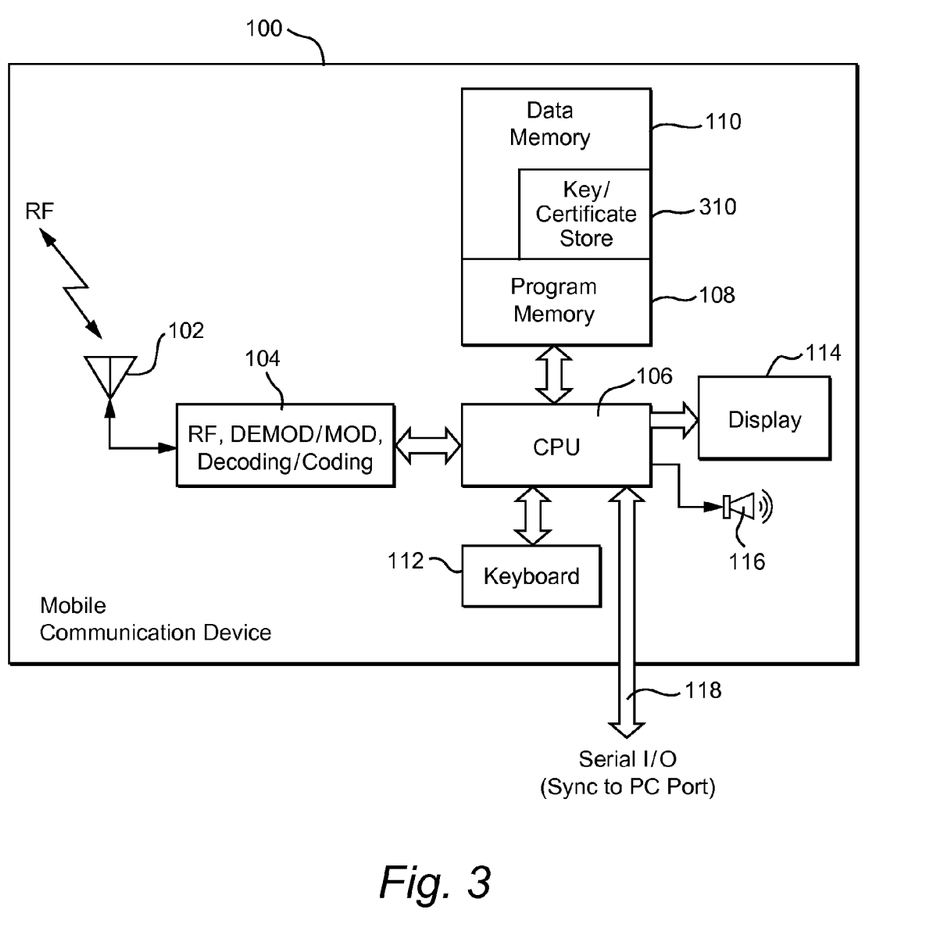
FIG. 3 is an abbreviated schematic diagram of hardware included within an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 20 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

Figure 4:
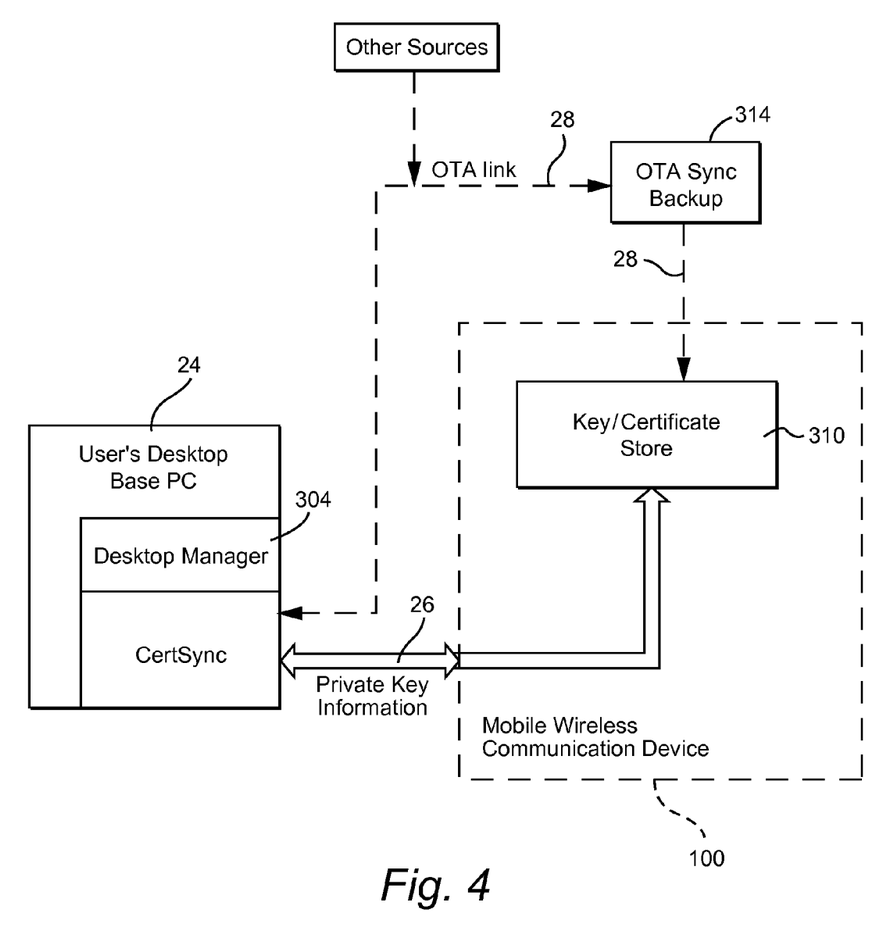
FIG. 4 is an abbreviated schematic functional diagram of the hardware/software utilized to achieve updating of the mobile wireless communication device key/certificate store in the exemplary embodiment of FIG. 1.

As depicted in FIG. 4, the user's base unit 24 may be used to update the mobile wireless communications device 100 with information including, for example, private key information and digital certificate information. The user's base station 24 is typically a desktop PC, and may be of conventional hardware and operating system design. It will typically include desktop manager program logic 304 (in the form of, for example, executable computer program logic) for managing, among other things, a normal data synchronization connection to device 100. As previously mentioned, in the environment of mobile wireless communications systems, such a desktop manager may typically include logic for synchronizing cryptographic message certificates. Such logic is denoted here as Cert Sync.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign or Entrust, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 5:
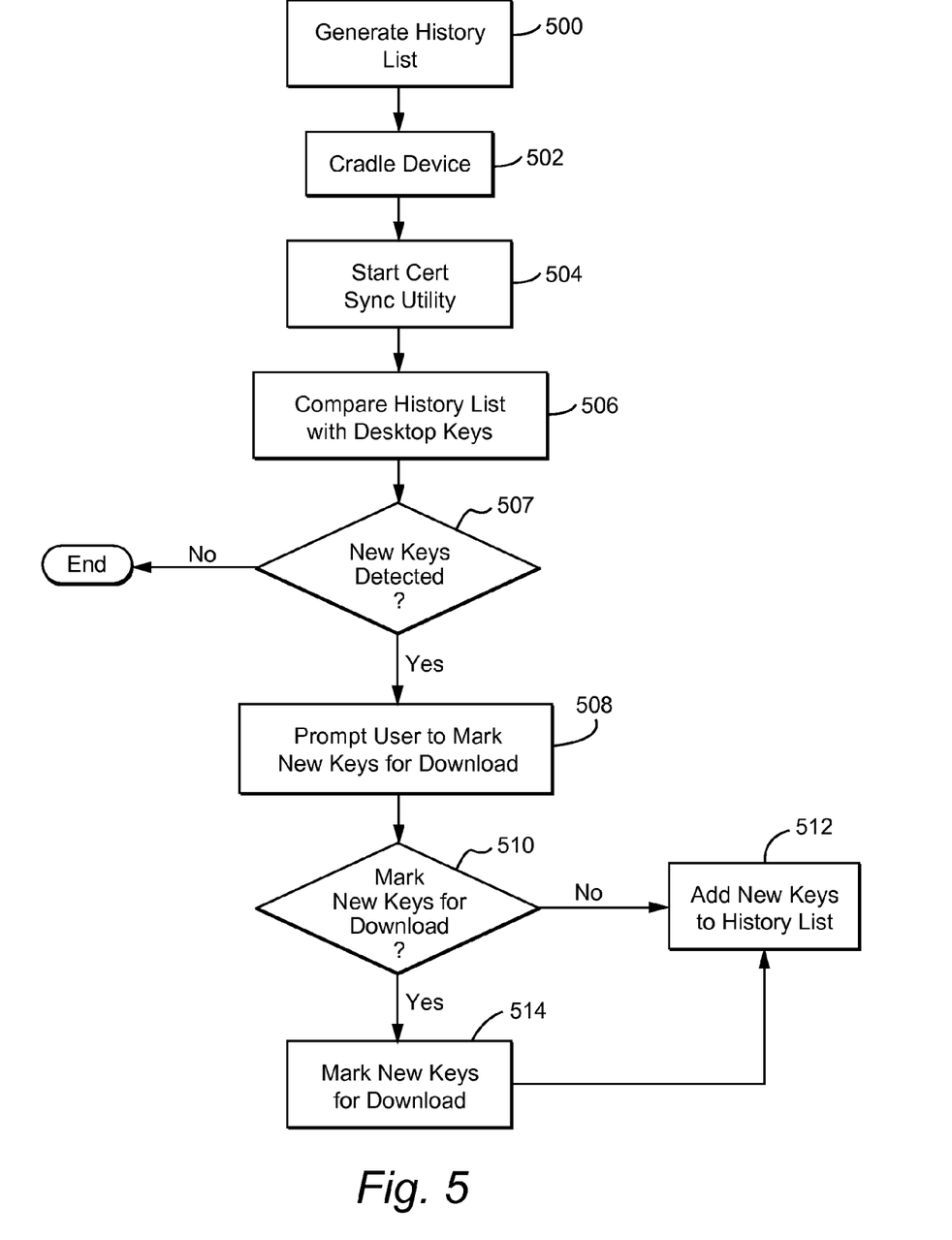
FIG. 5 is an exemplary abbreviated schematic flow diagram of an automated key management system according to an exemplary embodiment of the present invention.

FIG. 5 illustrates an exemplary embodiment of the present disclosure showing one form of automated key management according to the present disclosure. At the outset, a history list of keys that have been seen or used in the past is generated 500. Each time the device is put in communication with a desktop 502, Cert Sync (or any similar application) is automatically invoked and begins running 504. Cert Sync compares the history list with the list of keys on the user's desktop 506. If new keys have been added to the system since the last update (or last communication of the mobile wireless communications device with the desktop) they will not appear on the history list, and will thus be detected at step 507. If new keys are detected 507, the user will be prompted to mark the new keys for downloading 508. If the user elects to mark the new keys 510, they new keys are marked for download 514. The next time the user elects to download keys to his mobile device, any keys that were previously marked for download in step 514 will be downloaded to the user's device. Once the new keys have been marked, the history list is updated with the newly downloaded key list 512. At step 510, if the user elects not to mark the new keys, the history list is nevertheless updated with the new key information 512.

Figure 6:
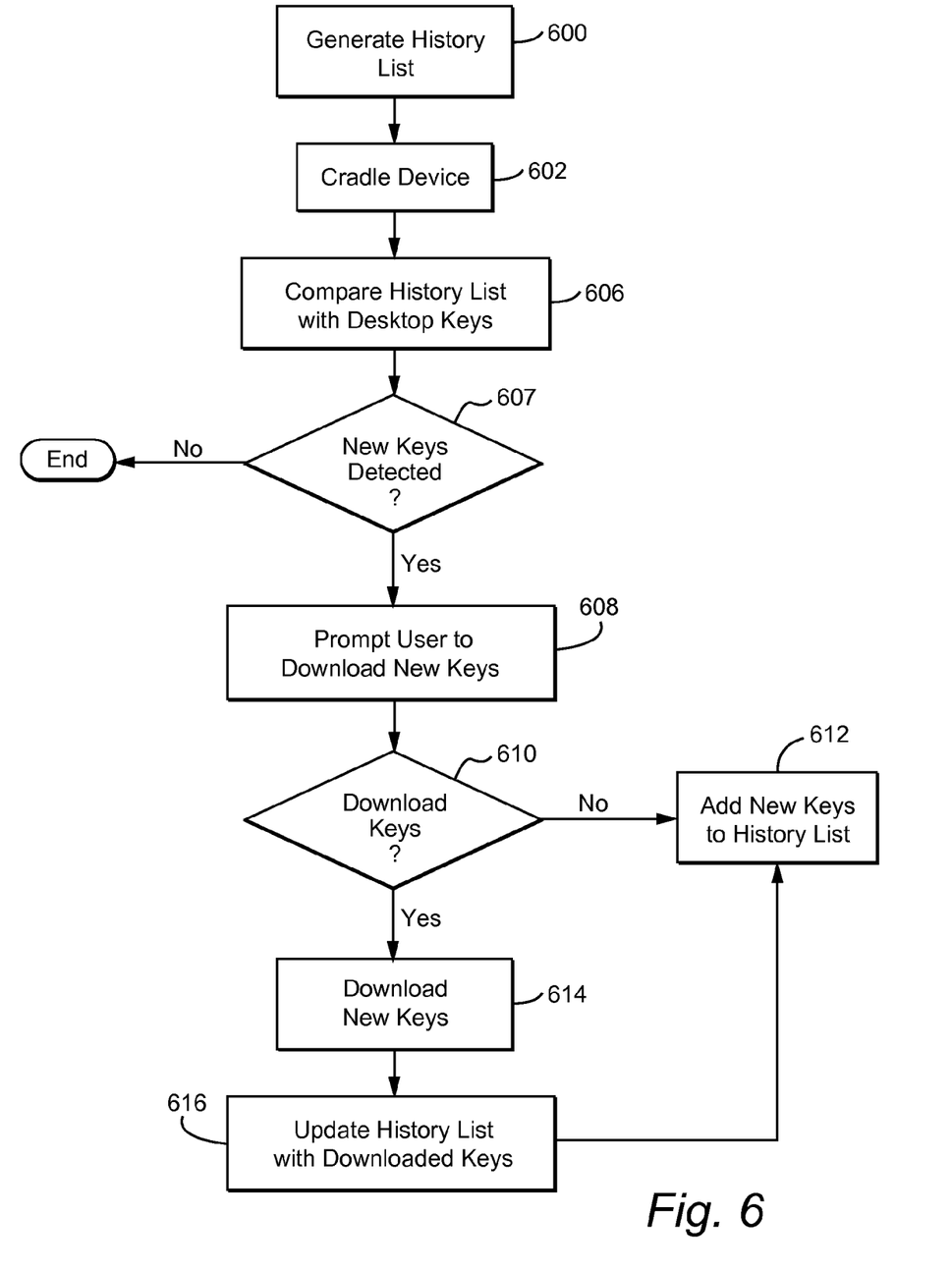
FIG. 6 is an exemplary abbreviated schematic flow diagram of an automated key management system according to another exemplary embodiment of the present invention.

In an alternative embodiment illustrated in FIG. 6, certificates may be synchronized automatically when the user puts his or her mobile wireless communications device in communication with the desktop 602 after the history list has been generated 600. In this embodiment, the keys of the mobile wireless communication device are updated without running the Cert Sync application. According to this alternative embodiment, new certificates are checked for by comparing the desktop keys to the history keys 606. If new keys are detected 607, the user is prompted to download the new keys 608. If the user elects to download the new keys 610, the new keys are downloaded 614, and the history list updated 616. If the user elects not to download the new keys at 610, the history list is nevertheless updated with the new key information 612. Alternatively, when new keys are detected, the user may be prompted to run, for example, the Cert Sync application to mark and download the new keys, and these new keys may be downloaded, for example, as set forth above with reference to FIG. 5.

Figure 7:
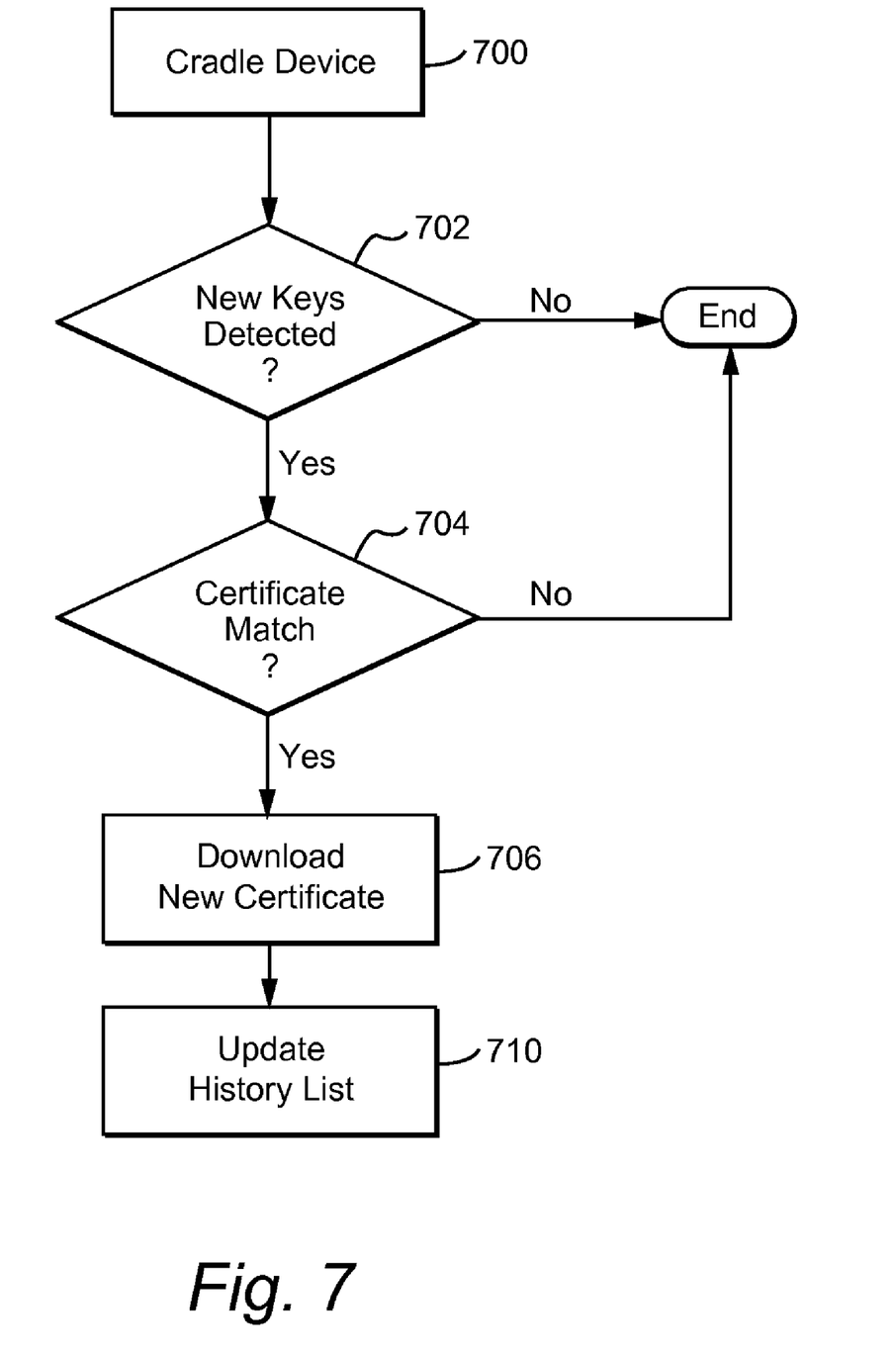
FIG. 7 is an exemplary abbreviated schematic flow diagram of an automated key management system according to yet another exemplary embodiment of the present invention.

According to yet another embodiment, illustrated in FIG. 7, automatic downloading of new keys that replace expired keys on the device is disclosed. In this embodiment, when the user puts the mobile wireless communications device in communication with the desktop 700, a check is automatically made for new keys 702 by comparing the history list with the list of keys at the desktop. For each new key, if the corresponding certificate matches an existing certificate 704, the new certificate is automatically downloaded 706 without prompting the user. Once the download is completed, the history list is updated 710. Thus, the process is entirely transparent to the user. It is noted that a matching certificate is one that appears to replace an existing certificate, as the old expired certificate has the same common name and issuer name as the new certificate.

It will be understood that the above described key management system has been described with respect to mobile wireless communications devices, and is intended to be illustrative only. It will be apparent to those skilled in the art that this type of key management system has wide ranging application in unlimited and innumerable systems, especially those encountered in the computer and electronics fields.

The invention claimed is:

1. A system for processing electronic messages, said system comprising a base computer, said base computer comprising:
    a first memory for storing keys for use in secure electronic messages;
    wherein a current list of keys is stored in said first memory, and a history list of keys is maintained and stored in the first memory at said base computer;
    wherein said history list of keys identifies a plurality of keys made previously available for download to a second memory at a mobile device; and
    program logic operable to generate a new key indicator for identifying keys that have not been previously available for download, said new key indicator being generated by comparing said history list of keys with said current list of keys stored in said first memory, and for identifying keys that are identified in said current list of keys but not in said history list of keys.

2. The system of claim 1, wherein said mobile device comprises a wireless device.

3. The system of claim 1, further comprising a device that receives said mobile device and provides a hard wired interface enabling communication between said base computer and said mobile device.

4. The system of claim 1, wherein an interface between said mobile device and said base computer comprises a wireless interface invoked by one or more commands initiated on said mobile device.

5. The system of claim 1, wherein said program logic is invoked via a key synchronization utility running on said base computer.

6. The system of claim 1, wherein said keys are provided in digital certificates.

7. The system of claim 1, wherein said program logic is further operable to detect keys added to said first memory of said base computer, wherein said current list of keys identifies said keys added to said first memory of said base computer.

8. The system of claim 1, wherein said program logic is further operable to update said history list of keys after said comparing.

9. The system of claim 1, wherein said new key indicator is generated automatically after said mobile device is put into communication with said base computer.

10. A method of facilitating an update of cryptographic key store of a mobile communications device, wherein the method comprises:
    maintaining a current list of keys stored in a first memory of a base computer;
    maintaining a history list of keys stored in the first memory of the base computer, wherein said history list of keys identifies a plurality of keys made previously available for download to a second memory at the mobile device;
    identifying new keys in said memory of said base computer by comparing said history list of keys with said current list of keys stored in the memory of said base computer, wherein said new keys comprise keys that are identified in said current list of keys but not identified in said history list of keys; and
    generating a new key indicator identifying said new keys.

11. The method of claim 10, wherein said identifying new keys is accomplished using a certificate synchronization utility running on the base computer.

12. The method of claim 10, further comprising updating the history list of keys after said comparing.

13. The method of claim 10, further comprising detecting keys added to said memory of said base computer, wherein said current list of keys identifies said keys added to said memory of said base computer.

14. The method of claim 10, wherein said identifying is initiated automatically after establishing a communications connection between the base computer and the mobile device.

15. A non-signal computer-readable storage medium comprising a plurality of instructions, which when executed on a base computer, cause the base computer to perform a method of facilitating an update of a cryptographic key store of a mobile communications device, wherein the method comprises:
    maintaining a current list of keys stored in a first memory of the base computer;
    maintaining a history list of keys stored in the first memory of the base computer, wherein said history list of keys identifies a plurality of keys made previously available for download to a second memory at the mobile device;
    identifying new keys in said memory of said base computer by comparing said history list of keys with said current list of keys stored in the memory of said base computer, wherein said new keys comprise keys that are identified in said current list of keys but not identified in said history list of keys; and
    generating a new key indicator identifying said new keys.

16. The medium of claim 15, wherein said identifying new keys is accomplished using a certificate synchronization utility running on the base computer.

17. The medium of claim 15, said method further comprising updating the history list of keys after said comparing.

18. The medium of claim 15, said method further comprising detecting keys added to said memory of said base computer, wherein said current list of keys identifies said keys added to said memory of said base computer.

19. The medium of claim 15, wherein said identifying is initiated automatically after establishing a communications connection between the base computer and the mobile device.

* * * * *